United States Patent [19]

Munakata

[11] Patent Number: 4,911,096
[45] Date of Patent: Mar. 27, 1990

[54] MARK INDICATOR AND A MANUFACTURING METHOD THEREOF

[75] Inventor: Yasuhiko Munakata, Honjyo, Japan

[73] Assignee: Fujikiko Kabushiki Kaisha, Tokyo, Japan

[21] Appl. No.: 213,926

[22] Filed: Jun. 30, 1988

[30] Foreign Application Priority Data

Jul. 1, 1987 [JP] Japan .................................. 62-162479
Jul. 1, 1987 [JP] Japan .................................. 62-162478

[51] Int. Cl.$^4$ ...................... G01D 13/04; G01D 13/18
[52] U.S. Cl. ........................... 116/334; 116/DIG. 20; 116/28.1
[58] Field of Search ................ 40/546, 547, 552, 615, 40/616; 116/287, 334, 335, DIG. 20, DIG. 35, DIG. 36, 28.1; 362/26, 31

[56] References Cited

U.S. PATENT DOCUMENTS

| 1,626,383 | 4/1927 | Boedtcher | 40/615 |
|---|---|---|---|
| 2,261,578 | 11/1941 | Bauer | 40/615 |
| 2,376,305 | 5/1945 | Bauer | 428/68 |
| 2,475,400 | 7/1949 | Osborn | 362/31 |
| 2,652,652 | 9/1953 | Lasko | 40/546 |
| 2,738,755 | 3/1956 | Doane | 362/26 |
| 4,137,864 | 2/1979 | Lauper | 116/28.1 |

FOREIGN PATENT DOCUMENTS

| 2288640 | 5/1976 | France | 116/DIG. 20 |
|---|---|---|---|
| 59-1236 | 1/1984 | Japan . | |
| 59-95126 | 6/1984 | Japan . | |
| 36007 | 8/1985 | Japan | 116/334 |
| 1402839 | 8/1975 | United Kingdom | 116/28.1 |
| 2010169 | 6/1979 | United Kingdom . | |

OTHER PUBLICATIONS

IBM Technical Disclosure Bulletin, "Forming a Composite Molded Part", vol. 17, No. 8, Jan. 1975, pp. 2216-2217.

Primary Examiner—William A. Cuchlinski, Jr.
Assistant Examiner—W. Morris Worth
Attorney, Agent, or Firm—Foley & Lardner, Schwartz, Jeffery, Schwaab, Mack, Blumenthal & Evans

[57] ABSTRACT

A mark indicator comprises a transparent substrate; a recessed portion formed on a rear face of the transparent substrate and having a tapered shape widened on an open side thereof and having the shape of an indicating medium; and an indicating layer of the indicating medium disposed within the recessed portion. An alternative embodiment comprises an indicating substrate composed of a transparent material; and an indicating layer member disposed on a rear face of the indicating substrate and including an indicating layer having the shape of an indicating medium and substantially a trapezoidal shape in cross section, and a transparent layer disposed in a portion of the indicating layer member except for the indicating layer and substantially having the same thickness as that of the indicating layer. A method for manufacturing a mark indicator comprises the steps of forming a projecting portion in a molding die; setting a film and an indicating layer within the molding die; and flowing a transparent material into the molding die. An alternative method for manufacturing a mark indicator comprises the steps of setting, within a molding die, a film and an indicating layer member which includes an indicating layer and a transparent layer; and flowing a transparent material into the molding die.

10 Claims, 6 Drawing Sheets

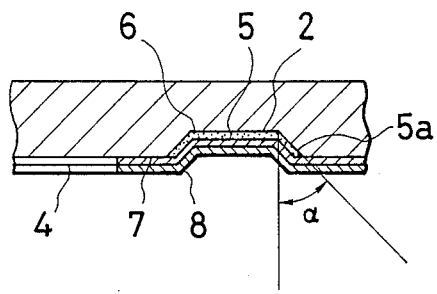
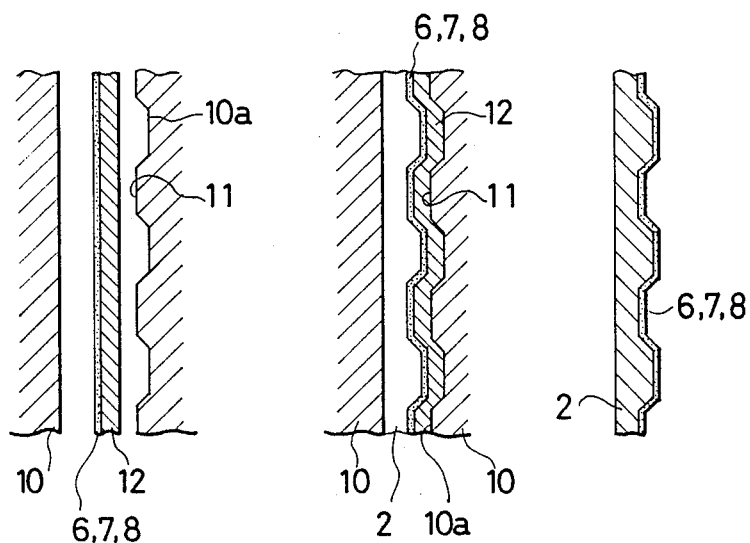

MARK INDICATOR AND A MANUFACTURING METHOD THEREOF

The present invention relates to a mark indicator and a manufacturing method thereof used for a control position indicator, etc., of an automatic change gear for a vehicle.

BACKGROUND OF THE INVENTION

A conventional control position indicator of an automatic change gear for a vehicle is constructed as shown in FIG. 1, for example. In such a structure, the indicator comprises an indicator plate 102 having initial characters of respective drive positions such as parking P, reverse R, neutral N and drive D on one side of a housing 100, a lighting device 103 for illuminating the indicator plate 102, and a slide plate 105 moved by a shift lever 104 on the other side of the housing 100.

An indicator window 106 is disposed in the indicator plate 102 corresponding to the respective characters in a position adjacent to an indicating portion 101. An unillustrated indicating hand is integrally disposed in the slide plate 105, and is moved by the operation of the shift lever 104. When the indicating hand is located just below the indicating window 106, the indicating hand indicates the drive position at that time.

In the conventional indicator plate 102 disposed in the control position display device, in order to make characters such as P, R, N, D, etc., of the indicating portion 101 look afloat, i.e., in order to provide the indication of a stereo-feeling for the characters, as shown in FIG. 2, an indicating substrate 108 made of transparent synthetic resin is formed on the rear side of the indicating plate 102 and has a recessed portion 107 in the shape of characters such as P, R, N, D, etc. Next, a coating material having predetermined colors is manually injected by an injector into the recessed portion 107 of the indicating substrate 108. Then, after the coating material is dried, the rear face of the indicating substrate 108 is coated with another coating material having a color as the background of the characters such as a black coating material, and is further coated with another coating material having a different color such as a white coating material, thereby manufacturing the indicator plate.

However, in the indicator plate 102 mentioned above, the coating materials are injected into the recessed portion 107 by an injector. Further, in the above indicator plate 102, the indicating substrate 108 having the recessed portion 107 in the shape of characters is formed on the rear side of the indicator plate 102, and a coating material is injected into the recessed portion 107 by the injector. Accordingly, in the conventional apparatus mentioned above, it is complicated to manufacture the apparatus and a skilled technique is needed.

Since the coating materials are used, it is necessary to carefully perform the coating operation such that the dust is not attached to the coated portions, and it is necessary to perform a dry operation after the respective coating operation. Therefore, it is very troublesome and it takes much time to manufacture the apparatus and defective products are often produced, and the manufacturing cost of the apparatus is expensive.

SUMMARY OF THE INVENTION

To overcome the problems mentioned above, an object of the present invention is to provide a mark indicator and a manufacturing method thereof in which it is not troublesome to manufacture the apparatus and the manufacturing time is reduced and the rate of generation of defective products is lowered, thereby reducing the manufacturing cost of the apparatus.

With the above object in mind, the present invention resides in a mark indicator comprising a transparent substrate; a recessed portion formed on a rear face of the transparent substrate and having a tapered shape widened on an open side thereof and having the shape of an indicating medium; and an indicating layer of the indicating medium disposed within the recessed portion.

A method for manufacturing a mark indicator comprises the steps of forming, in a molding die, a projecting portion having a tapered shape narrower on an indicating side thereof and having the shape of an indicating medium; setting, within the molding die, film means and an indicating layer of the same indicating medium as the projecting portion; and flowing a transparent material into the molding die to mold an indicating substrate and transfer the indicating layer from the film means into a recessed portion of the indicating substrate formed by the projecting portion of the molding die.

A mark indicator may comprise an indicating substrate composed of a transparent material; and an indicating layer member disposed on a rear face of the indicating substrate and including an indicating layer having the shape of an indicating medium and substantially a trapezoidal shape in cross section, and a transparent layer disposed in a portion of the indicating layer member except for the indicating layer and substantially having the same thickness as that of the indicating layer.

A method for manufacturing a mark indicator may comprise the steps of setting, within a molding die, film means and an indicating layer member which includes an indicating layer having the shape of an indicating medium and substantially having a trapezoidal shape in cross section, and a transparent layer disposed in a portion of the indicating layer member except for the indicating layer and substantially having the same thickness as that of the indicating layer; and flowing a transparent material into the molding die to mold an indicating substrate and transfer the indicating layer material on a rear face of the indicating substrate from the film means.

BRIEF DESCRIPTION OF THE DRAWINGS

The present invention will be more apparent from the following description of the preferred embodiments thereof in conjunction with the accompanying drawings in which:

FIGS. 3 to 5 show one embodiment of a mark indicator in accordance with the present invention in which FIG. 3 is a perspective view of an indicator plate in an embodiment of the mark indicator in accordance with the present invention; FIG. 4 is a plan view of the indicator plate; and FIG. 5 is an enlarged cross-sectional view of a main portion of the indicator plate;

FIGS. 6 to 9 show one embodiment of a method for manufacturing the mark indicator of the present invention in which FIG. 6A to 6C show views for explaining the manufacturing steps of the mark indicator; FIG. 7 is a plan view of a film member; FIG. 9 is a partially enlarged cross-sectional view of the film member and a molding die;

FIGS. 12A to 14B are views showing another embodiment of the manufacturing method of the mark indicator of the present invention in which FIGS. 12A to 12C are views showing the manufacturing steps, FIG. 13 is a plan view of a film member, FIG. 14B is an enlarged cross-sectional view taken along line b—b of FIG. 13.

DETAILED DESCRIPTION OF THE PREFERRED EMBODIMENTS

The preferred embodiments of the present invention will now be described with reference to the accompanying drawings.

Figure 3:
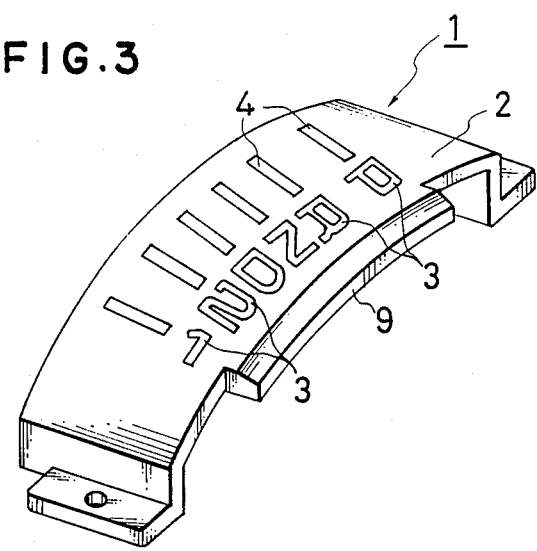
Figure 4:
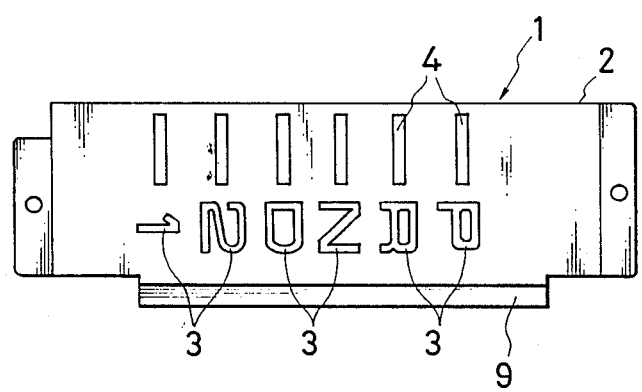

FIGS. 3 to 5 show one embodiment of a mark indicator of the present invention applied to a control position indicator of an automatic change gear for a vehicle.

Figure 1:
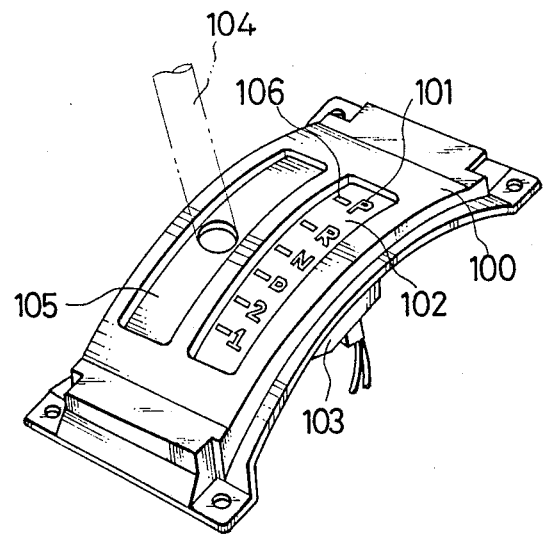
FIG. 1 is a perspective view of a whole control position indicator of an automatic change gear for a vehicle.
Figure 2:
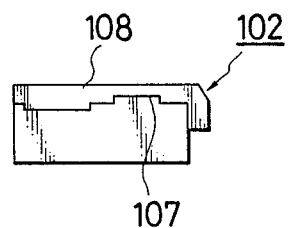
FIG. 2 is a cross-sectional view of an indicator plate arranged in the indicator of FIG. 1.

An indicator plate 1 is composed of a transparent substrate 2 made of transparent synthetic resin in which an indicating section 3 composed of characters of respective drive positions such as parking P, reverse R, neutral N, and drive D, and numerals such as 1, 2, etc., and an indicating window 4 are disposed as in the conventional portions shown in FIG. 1.

In the embodiment of the present invention, as shown in FIG. 5, a recessed portion 5 is disposed on the rear face of the transparent substrate 2, and has a tapered portion 5a such that the open side of the recessed portion 5 is widened, and has a shape of an indicating medium such as characters like parking P, numerals, etc. An layer 6 for indicating the indicating medium such as the same characters and numerals as those of the recessed portion 5 is disposed by transfer within the recessed portion 5, thereby constituting the indicating section 3, which is a characterized portion of the present invention.

As shown in FIG. 5, it is sufficient that inclination angle α of the tapered portion 5a of the recessed portion 5 is at least an angle greater than 10°. When the inclination angle α is less than 10°, the disadvantages are caused in transfer that a film member 12 as a base of the indicating layer 6 is cut by a corner of the recessed portion 5 (see FIGS. 7 and 8A and 8B). When the inclination angle α is too large, a lens effect is reduced and a stereo-feeling cannot be provided when the indicating section 3 (indicating layer 6) is viewed from the front side of the transparent substrate 2.

The indicating layer 6 is colored by green with respect to the character portions of parking P and neutral N, and is colored by white with respect to the other portions. A colored layer 7 having a color as the background of the indicating layer 6 such as a black colored layer is disposed by transfer on the rear face of the transparent substrate 2, except for a portion thereof corresponding to the indicating window 4. Further, a white colored layer 8 is disposed by transfer on the colored layer 7.

The indicating layer 6 and the colored layers 7 and 8 may be transferred after the molding of the transparent substrate 2., and may be transferred at the same time as the molding of the transparent substrate 2 as shown in FIGS. 6A to 6C.

A reflecting portion 9 is disposed at a side edge of the transparent substrate 2, and refracts illuminating light from an unillustrated lighting device approximately in a perpendicular direction thereof, and guides the refracted light from the interior of the transparent substrate 2 to the indicating section 3 and the indicating window 4.

The operation of the apparatus in the embodiment mentioned above will be described next.

When an indicating hand is moved by the operation of a shift lever and is located just below the indicating window 4, it indicates a drive position at that time, which is similar to the conventional construction. However, in the present invention, since the recessed portion 5 has a tapered shape, a stereo-feeling is further caused by a lens effect when the indicating section 3 is viewed from the front side of the transparent substrate 2.

An embodiment of a method for manufacturing the mark indicator in accordance with the present invention will be described next.

FIGS. 6 to 9 show an embodiment of the present invention applied to the manufacture of the indicator plate 1.

As shown in FIGS. 6A and 6B, a projecting portion 11 is formed on one inner wall face 10a of a molding die 10 for molding the transparent substrate 2 shown in FIGS. 3 and 4, and has a tapered shape thinner on the end tip side thereof, and has a shape of an indicating medium such as characters like parking P, numerals, etc., which corresponds to the shape of the recessed portion 5.

Figure 7:
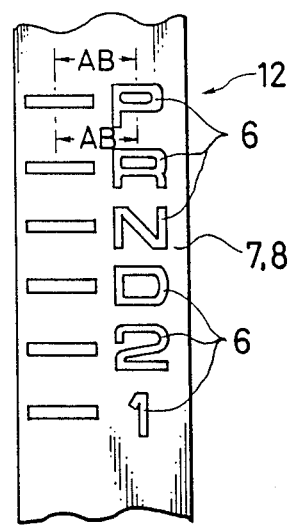
Figure 8A:
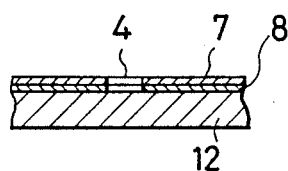
FIG. 8A is an enlarged cross-sectional view taken along line A—A of FIG. 7.
Figure 8B:
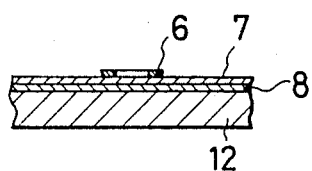
FIG. 8B is an enlarged cross-sectional view taken along line B—B of FIG. 7.
Figure 9:
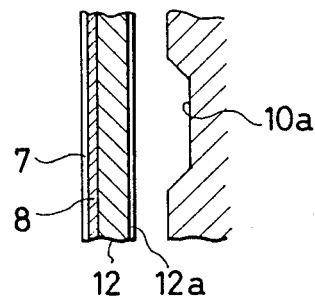

As shown in FIGS. 8A and 8B, the indicating layer 6, and the colored layers 7 and 8 shown in FIG. 3 are laminated on a face of the film member 12 by a printing means. The colored layers 7 and 8 are not laminated in a portion corresponding to the indicating window 4 to which the film member 12 is exposed as shown in FIGS. 7 and 8A. Further, the rear face of the film member 12 is coated with a thin adhesive 12a as shown in FIG. 9. The film member 12 is wound in the shape of a roll, and is pulled out into the molding die 10 at the manufacturing time.

When the indicator plate 1 is manufactured, the film member 12 is first pulled out within the molding die 10, the indicating layer 6 is positioned to be located above the projecting portion 11, and is set on the side of the one inner wall face 10a. Next, when a transparent synthetic resin material is flowed into the molding die 10, the film member 12 is pressed to the one inner wall face 10a of the molding die 10 by the transparent synthetic resin material, and is bent along the shape of the projecting portion 11 as shown in FIG. 6B. At this time, the indicating layer 6 is transferred within the recessed portion 5 by the pressure and heat of the transparent synthetic resin material simultaneously when the transparent substrate 2 is molded, and the colored layers 7 and 8 are transferred on the rear face of the transparent substrate 2. The film member 12 is left by the adhesive 12a on the one inner wall face 10a of the molding die 10, and is thereby left within the molding die 10 when the molded transparent substrate 2 is taken out of the molding die 10 as shown in FIG. 6C. When the next molding operation is performed, the remaining film member 12 is peeled, and an operation similar to the above operation is repeated.

In the embodiment mentioned above, the present invention is applied to the control position indicator of an automatic change gear for a vehicle, but is not limited to this case. For example, the present invention can be widely applied to mark indicators in office automation (OA) systems, audio devices, etc.

In accordance with the construction of the present invention mentioned above, it is not necessary to inject a coating material into the recessed portion by an injector, and it is not necessary to await the drying of the coating material. Accordingly, it is not complicated to manufacture the apparatus, and the manufacturing time is reduced and the rate of generation of detective products is lowered and the manufacturing cost is reduced.

Figure 10:
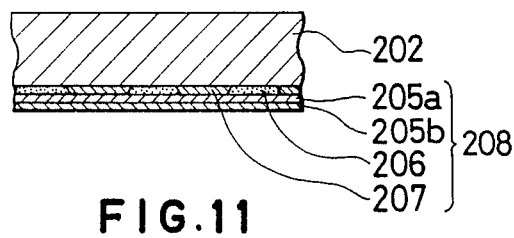
FIG. 10 shows an enlarged cross-sectional view of an indicator plate in accordance with another embodiment of the present invention and corresponding to FIG. 5.
Figure 11:
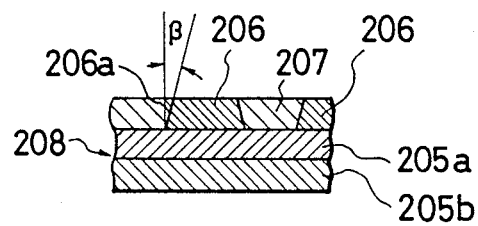
FIG. 11 is a partially enlarged cross-sectional view of an indicating layer of the indicator plate in the another embodiment of the present invention.

FIGS. 10 and 11 show another embodiment of the present invention. In this embodiment, an indicating layer 206 is disposed on a base layer 205 and has a shape of marks such as characters, numerals, etc. like parking P, and has approximately a trapezoidal shape in cross-section. A transparent layer 207 having the same thickness as that of the indicating layer 206 is disposed in a portion except for the indicating layer 206. An indicating layer member 208 having the indicating layer 206 and the transparent layer 207 is disposed by transfer on the rear face of an indicating substrate 202, which is a characterizing feature this embodiment.

Inclination angle $\beta$ of a tapered portion 206a of the indicating layer 206 shown in FIG. 11 is set to be about 10°. When inclination angle $\beta$ is too large, it gives a flat feeling and no stereo-feeling. Accordingly, it is necessary to set inclination angle $\beta$ not to be too large.

The indicating layer 206 is colored by green with respect to a portion of characters of parking P, neutral N, and is colored by white with respect to the remaining portion of characters and numerals. The base layer 205 comprises two layers composed of an upper layer 205a colored by a color as the background of the indicating layer 206 such as black, and a lower layer 205b colored by white. The base layer 205 is not formed in a portion corresponding to an indicating window 204.

Figures 12A, 12B, 12C:
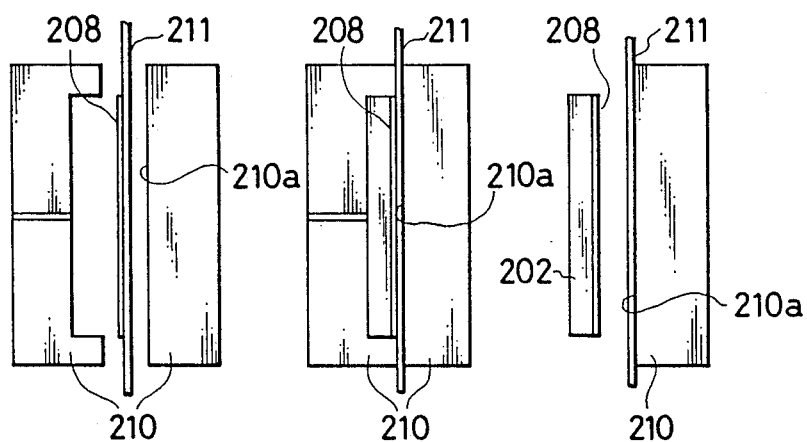

The indicating layer member 208 may be transferred after the formation of the transparent substrate 202, and may be transferred at the same time when the transparent substrate 202 is formed as shown in FIGS. 12A to 12C.

As in the first embodiment of the present invention, a reflecting portion 209 is disposed at a side edge of the transparent substrate 202, and refracts illuminating light from an unillustrated lighting device approximately in the perpendicular direction thereof, and guides the refracted light from the interior of the transparent substrate 202 to the indicating section 203 and the indicating window 204.

The operation of the apparatus in the embodiment mentioned above will be described next.

When an indicating hand is moved by the operation of a shift lever and is located just below the indicating window 204, it indicates a drive position at that time, which is similar to the conventional construction. In this embodiment, the indicating layer 206 has approximately a trapezoidal shape in cross-section, and the transparent layer 207 is formed in a portion of the indicating layer member 208 except for the indicating layer 206, and the base layer 205a as the background is colored by black, thereby providing a stereo-feeling for the indicating layer 106 by a lens effect and a clear image thereof.

Another embodiment of the manufacturing method of the mark indicator of the present invention will be described next.

FIGS. 12A to 14B show an embodiment in which the indicator plate is manufactured. In this embodiment, it is not necessary to dispose a projection, etc. having an indicating medium such as characters, numerals, etc. like parking P in an inner wall of a molding die 210 of FIGS. 12A and 12B for molding the transparent substrate 202, as in the case of the molding of the conventional indicator plate.

Figure 13:
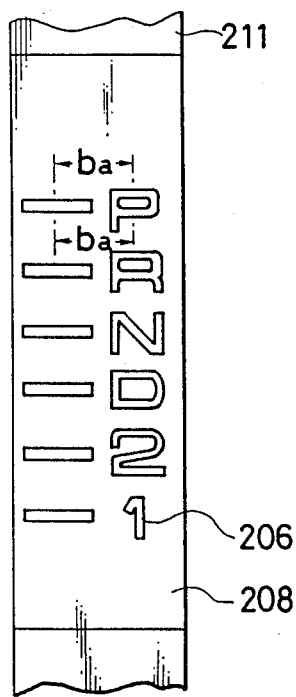
Figure 14A:
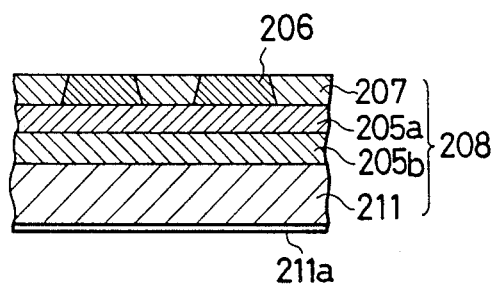
FIG. 14A is an enlarged cross-sectional view taken along line a—a of FIG. 13.
Figure 14B:
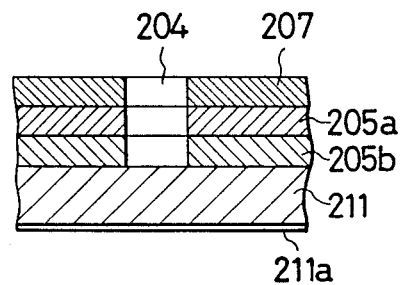

The base layer 205, indicating layer 206, transparent layer 207, etc. of FIGS. 10 and 11 constituting the indicating layer member 208 are laminated on a surface of a film member 211 by a printing means as shown in FIGS. 13 and 14A and 14B. The base layer 205 is not formed in the portion of the indicating layer member 208 corresponding to the indicating window 204 to which the film member 211 is exposed as shown in FIG. 14B. The rear side of the film member 211 is coated with a thin adhesive 211a. The film member 211 is wound in the shape of a roll, and wound out into the molding die 210 at the manufacturing time.

As shown in FIG. 12A, when the indicator plate is manufactured, the film member 211 is first pulled out into the molding die 210, and is positioned and set on the side of the one inner wall face 210a. Subsequently, a transparent synthetic resin material is flowed into the molding die 210 and the film member 211 is pressed to the one inner wall face 210a by the transparent synthetic resin material as shown in FIG. 12B. At this time, the indicating layer member 208 is transferred by the pressure and heat of the transparent synthetic resin material at the same time when the transparent substrate 202 is molded.

Since the film member 211 is adhered to the one inner wall face 210a of the molding die 210 by the adhesive 211a, the film member 211 is left within the molding die 210 when the molded transparent substrate 202 is taken out of the molding die 210 as shown in FIG. 12C. In the next molding operation, the remaining film member 211 is peeled, and the similar operation is repeated.

The indicator plate is thus manufactured as shown in FIG. 10. In this case, the indicating layer member 208 can be transferred simultaneously when the indicating substrate 202 is molded, so that, in comparison with the conventional case and the case in which the indicating layer member 208 is transferred after the molding of the indicating substrate 202, it is not complicated to manufacture the apparatus and the number of manufacturing steps can be reduced and the manufacturing time can be greatly reduced and the rate of generation of defective products can be lowered.

Further, since a projecting portion having a shape of characters, etc. is not formed in the molding die 210 of the indicating substrate 202, the cost of the molding die 210 itself is cheap and the number of manufacturing steps is reduced, thereby greatly reducing the manufacturing cost of the apparatus.

In the embodiment mentioned above, the present invention is applied to the control position indicator of the automatic change gear for a vehicle, but is not limited to this case. For example, the present invention can be widely applied to mark indicators in instruments for vehicles, office automation(OA) systems, or audio systems.

Further, the above embodiment is related to the case in which the indicating layer member 208 includes the base layer 205, but the base layer 205 is omitted when a backing plate colored on the indicating substrate 202 is used.

As mentioned above, in the mark indicator of the present invention constructed as above, the indication of the indicating layer of marks such as characters, numerals, etc. can be indicated clearly while providing a stereo-feeling therefor, and it is not necessary to inject a coating material into the recessed portion by an injector when the apparatus is manufactured, and it is not necessary to await the drying of the coating material. Accordingly, it is not complicated to manufacture the apparatus, and the manufacturing time can be reduced and the rate of generation of defective products is lowered and the manufacturing cost can be reduced.

Also, the present invention provides a method for manufacturing the mark indicator which can clearly indicate an indicating layer of marks such as characters, numerals, etc. while providing a stereo-feeling therefor, and it is not necessary to inject a coating material into a recessed portion by an injector when the apparatus is manufactured, and it is not necessary to await the drying of the coating material, and the molding of the indicating substrate and the transfer of the indicating layer member can be simultaneously performed. Therefore, as mentioned above, it is not complicated to manufacture the apparatus, and the manufacturing time can be reduced and the rate of generation of defective products is lowered and the manufacturing cost can be greatly reduced.

What is claimed is:

1. A mark indicator comprising:
   a transparent substrate;
   a recessed portion formed on a rear face of the transparent substrate and having a tapered shape widened on an open side thereof and having the shape of an indicia; and
   an indicating layer comprised of a solid transfer of an indicating medium disposed within the recessed portion.

2. A mark indicator as claimed in claim 1, wherein the indicating medium comprises characters and numerals.

3. A mark indicator as claimed in claim 1, wherein the indicating layer has a tapered portion and the tapered portion has a predetermined inclination angle.

4. A mark indicator as claimed in claim 3, wherein said indicating medium is in the form of an indicating layer having a trapezoidal shape in cross section, and a transparent layer disposed in a portion of the indicating medium about the indicating layer and substantially having the same thickness as that of the indicating layer.

5. A mark indicator as claimed in claim 4, wherein the indicating medium comprises characters and numerals.

6. A mark indicator as claimed in claim 4, wherein the indicating medium is transferred by pressure and heat during molding transparent material.

7. A mark indicator comprising:
   a transparent substrate;
   a recessed portion formed on a rear face of the transparent substrate and having a tapered shape widened on an open side thereof and having the shape of an indicia;
   a solid indicating layer of an indicating medium disposed within the recessed portion and having a tapered portion;
   a first colored layer disposed on the rear side of the transparent substrate and a second colored layer disposed on the first colored layer;
   wherein the indicating medium has the shape of a character or numeral;
   wherein the indicating layer is formed by transfer of a solid layer of the indicating medium within the recessed portion;
   wherein the first colored layer is disposed by transfer on the rear side of the transparent substrate;
   wherein the second colored layer is disposed by transfer on the first colored layer; and
   wherein the tapered portion has a predetermined inclination angle of at least 10°.

8. A mark indicator as claimed in claim 3, further comprising a first colored layer disposed on the rear side of the transparent substrate, and a second colored layer disposed on the first colored layer on the side opposite said transparent substrate.

9. A mark indicator as claimed in claim 8, wherein said predetermined angle is at least 10°, whereby a stereo effect is provided for said shape of the indicating medium.

10. A mark indicator comprising:
    an indicating substrate comprising a transparent material;
    at least one indicating medium disposed on a rear face of the indicating substrate, said indicating medium being formed of an indicating layer of solid material shaped into the form of an indicating character and having a color discernible through said indicating substrate;
    means for providing a stereo effect to said indicating medium, said means comprising said indicating character having a cross-sectional shape that tapers outwardly transversely of said indicating substrate in the direction from front to back of said indicating substrate, wherein said taper has an angle of at least 10°;
    a first colored layer disposed on the rear side of the transparent substrate; and
    a second colored layer disposed on the first colored layer on the side opposite said transparent substrate.

* * * * *